(12) United States Patent
Morton et al.

(10) Patent No.: US 11,238,011 B2
(45) Date of Patent: Feb. 1, 2022

(54) INTELLIGENT METHOD TO INDEX STORAGE SYSTEM FILES ACCOUNTING FOR SNAPSHOTS

(71) Applicant: EMC IP Holding Company LLC, Hopkinton, MA (US)

(72) Inventors: James Morton, Adamstown, MD (US); Ming Zhang, Shanghai (CN); Weiyang Liu, Shanghai (CN); Lihui Su, Shanghai (CN); Min Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 425 days.

(21) Appl. No.: 16/250,993

(22) Filed: Jan. 17, 2019

(65) Prior Publication Data

US 2020/0233837 A1   Jul. 23, 2020

(51) Int. Cl.
| | |
|---|---|
| *G06F 16/13* | (2019.01) |
| *G06F 16/18* | (2019.01) |
| *G06F 16/14* | (2019.01) |
| *G06F 16/11* | (2019.01) |

(52) U.S. Cl.
CPC ............ *G06F 16/13* (2019.01); *G06F 16/128* (2019.01); *G06F 16/156* (2019.01); *G06F 16/1873* (2019.01)

(58) Field of Classification Search
CPC .... G06F 16/13; G06F 16/1873; G06F 16/156; G06F 16/128
USPC ......................................................... 707/830
See application file for complete search history.

(56) References Cited

U.S. PATENT DOCUMENTS

| | | | |
|---|---|---|---|
| 2009/0182963 A1* | 7/2009 | Prahlad ............... | G06F 11/1448 711/162 |
| 2018/0165298 A1* | 6/2018 | Koos ..................... | G06F 16/176 |
| 2018/0329967 A1* | 11/2018 | Lee ......................... | G06F 16/27 |

* cited by examiner

*Primary Examiner* — Robert W Beausoliel, Jr.
*Assistant Examiner* — Arthur Ganger
(74) *Attorney, Agent, or Firm* — Womble Bond Dickinson (US) LLP

(57) ABSTRACT

Indexing files to account for snapshots can include generating, based on a scan of the storage system, one or more file records. Each file record of the one or more file records can correspond to a file stored on the storage system at the time of the scan. The file records can be maintained based on one or more notifications received from the storage system. A snapshot list of the storage system can be maintained, the snapshot list having snapshot data corresponding to one or more snapshots stored on the storage system. A search result can be generated that satisfies a search parameter based at least on a) the one or more file records and/or b) the snapshot list.

20 Claims, 6 Drawing Sheets

INTELLIGENT METHOD TO INDEX STORAGE SYSTEM FILES ACCOUNTING FOR SNAPSHOTS

FIELD OF THE INVENTION

Embodiments of the present invention relate generally to data storage systems. More particularly, embodiments of the invention relate to indexing a storage system, the indexing taking into account snapshots.

BACKGROUND

Computer-based storage devices can be used to store computer data, for example, files. In some cases, a storage device, for example, a network attached storage (NAS) device, can house billions of files and have hundreds of terabytes of capacity per chassis. The capacity and data processing speed of such a device continues to increase as technology progresses. In some cases, storage devices back up files by taking a snapshot of the storage system. The snapshot can be used for various purposes, for example, to retrieve previous version of a file, or retrieve a lost or corrupt file, or for data analysis purposes.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
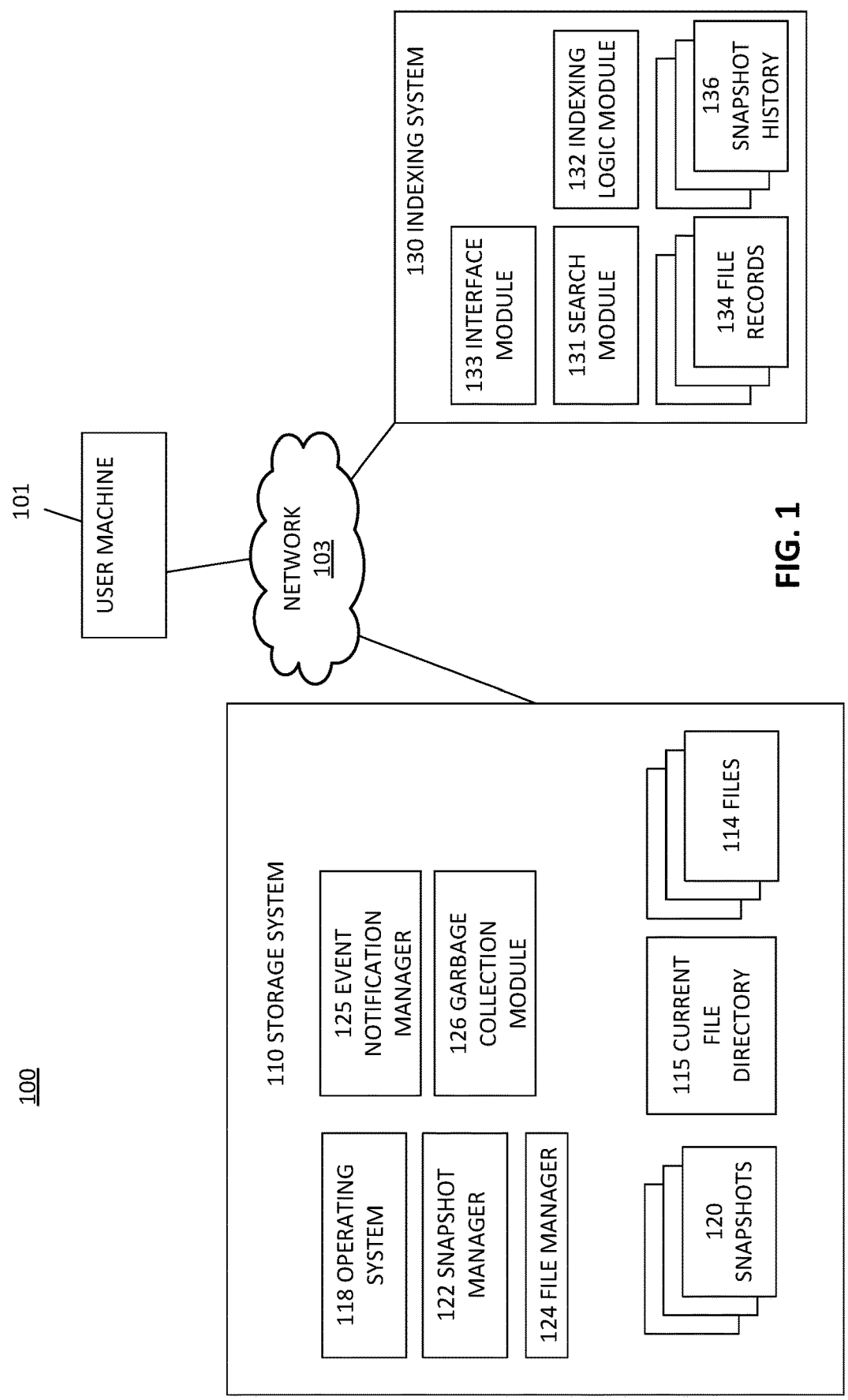
FIG. 1 shows a storage solution according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Storage systems, e.g., NAS devices, can implement data protection algorithms to allow users to retrieve files that have become corrupt or deleted. A data protection plan can include a mixture of snapshots and backups. Backups can include generating copies of some or all files in the storage device, and storing them on an external (backup) storage system. In addition, snapshots can be generated for the storage system, each snapshot being a duplicate of the storage system and the files therein, at the time the snapshot was generated. Snapshots are typically faster than backups because they can store information locally rather than copying data externally.

Snapshots can be implemented at regular intervals in a data protection plan so that files can be backed up in a predictable manner. Snapshots can provide a quick and convenient way to protect data in a storage system between or in lieu of backups. Snapshots, however, present a problem in indexing and searching. For example, each snapshot can be as large as the entire file system of the storage system, which can have hundreds of billions of files or more. Thus, scanning every snapshot to maintain a file index is neither desirable nor practical. Therefore, it is desirable to provide an improved scanning process of snapshots to generate file data and efficiently index and store the file data. It is also desirable to provide a straight forward mapping of files to snapshot, and vice versa. Finally, it is recognized to be beneficial to provide recovery of deleted, modified or corrupt files by searching the indexed file data and retrieving a file from a snapshot.

Beneficially, in one aspect, a solution is described that allows for a user to a) search for a file that is currently active on the file system (e.g., stored on a current file directory); b) search for a file that has been deleted but still exists in a snapshot, and restore it back to the file system; c) browse all versions of a particular file over all snapshots, and restore one version to the file system; d) restrict searches to files in a particular snapshot; and e) view all snapshots that a particular file exists in.

In one embodiment, a method is performed by a computing device for indexing a storage system, the method including: generating, based on a scan of the storage system, one or more file records, each file record of the one or more file records corresponding to a file stored on the storage system at the time of the scan; maintaining the one or more file records based on one or more notifications received from the storage system; maintaining a snapshot list of the storage system, the snapshot list having snapshot data corresponding to one or more snapshots stored on the storage system; and generating a search result, based at least on a) the one or more file records or b) the snapshot list, that satisfies one or more search parameters.

In one embodiment, a system includes a processing system having at least one hardware processor, the processing system coupled to a memory programmed with executable instructions that, when executed by the processing system, perform operations, the operations including: generating, based on a scan of the storage system, one or more file records, each file record of the one or more file records corresponding to a file stored on the storage system at the time of the scan; maintaining the one or more file records based on one or more notifications received from the storage system; maintaining a snapshot list of the storage system, the snapshot list having snapshot data corresponding to one or more snapshots stored on the storage system; and generating a search result, based at least on a) the one or more file records or b) the snapshot list, that satisfies one or more search parameters.

Overview

Referring now to FIG. 1, a storage solution or system 100 is shown according to one embodiment. A storage system (e.g., a storage server) 110 can be attached to network 103.

Network 103 may be any type of networks such as a local area network (LAN), a wide area network (WAN) such as the Internet, a fiber network, a storage network, or a combination thereof, wired or wireless.

In one embodiment, the storage system 110 can be a network attached storage (NAS) device. A NAS system allows storage and retrieval of data from a centralized location for authorized network users and various clients. NAS systems can be modular and/or scale-out, meaning that if additional storage is desired, one can add on to the existing NAS. In one embodiment, the storage system can be a cloud-based file storage system having one or more servers and applications to store and maintain data. Data, as described herein, can include files and file metadata (e.g., information about the file such as file size, file name, creation time, modification time, etc.). The storage system 110 can use, as computer memory for file storage, a hard drive disk, flash memory, or combinations thereof.

Storage system 110 can have an operating system 118 that manages task scheduling, execution of applications, I/O, memory, processor usage, and other basic computer functions. The storage system can have a file manager 124 that maintains and manages the files on the storage system, including maintaining current file directory 115 of active files stored on the storage system. It should be understood that the 'current' file directory is the file directory of the storage system, as opposed to previous states of the file directory, which are captured in snapshots 120. The snapshots can be scheduled regularly and/or performed upon request. A snapshot manager 122 can have configuration files that define when and how the snapshots are performed, and can be configured based on a user/administrator's preference and/or based on a data protection plan. Files 114, or instances of the files, can be persisted on the storage system through the snapshots 120. For example, if a first snapshot was generated having 'mytext.txt' in the current file directory, then that version of mytext.txt can be persist through the first snapshot in memory on the storage system. If a second snapshot is taken at a later time after 'mytext.txt' is modified, then the second version of mytext.txt also persists on the storage system through the second snapshot. At that moment, the second version can also be the active version that is in the current file directory. Finally, if mytext.txt is deleted from the current file directory, it is no longer 'active' but the first and second version of the file can still persist on the storage system through the first and second snapshots.

In one embodiment, the process and system described here helps a user locate which files and/or file versions still persist and which are 'orphaned' or no longer exist on the current file directory or on any of the snapshots. Furthermore, snapshots are sometimes deleted to free-up space in the storage system, which can require garbage collection for file records that are no longer relevant due to orphaned files. These issues are addressed in other sections.

An indexing system 130 can perform an initial scan of the storage system (e.g., via HTTPS REST API) to generate file records 134. To update and maintain the file records, an event notification manager 125 in the storage system can generate an event (e.g., common event enabler (CEE) framework) based on file system activity (e.g., when one or more files 114 are created, modified, moved from one directory to another, or deleted). In such a case, the event can trigger a notification to be sent to the indexing system 130. The notification can include relevant file data for the changed file (e.g., a file name, timestamp, whether the file was created, modified, moved or deleted, file size, file path, attribute changes, the user ID that changed the file, and more). In one embodiment, the notification manager can have a notification registry. Other systems, such as the indexing system 130, can register with the notification registry. The indexing system can send one or more notifications to systems that are registered on the notification registry. The notifications can be sent in real-time, for example, without delay, notwithstanding processing, buffering, and transmission delays.

The indexing system (e.g., an indexing server) can update the file records 134 based on received event notifications. An interface module 133 can receive a search request from a user machine 101. The search module can search file records 134 based on search parameters with known search algorithms.

The indexing system can have a snapshot list/history 136 that has an entry for each snapshot currently stored and/or previously generated in the storage system 110. In one embodiment, the indexing system can periodically and/or continuously poll the storage system for snapshot data, to maintain the accuracy of the snapshot history. An indexing logic module can relate file versions to snapshots based on the file records and a snapshot history 136, as discussed in further detail in other sections herein.

Process for Indexing a Storage System

Figure 2:
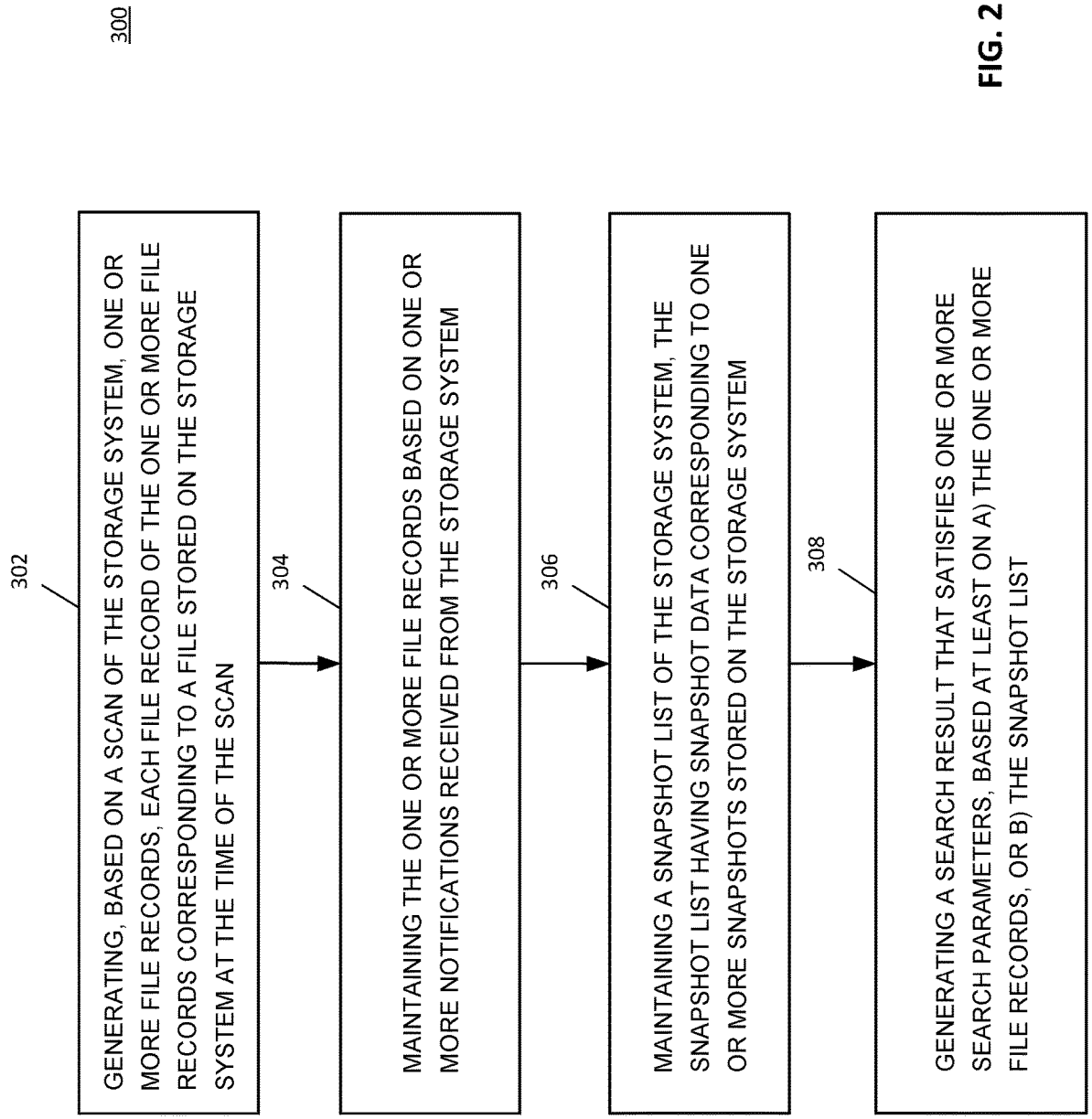
FIG. 2 shows a process for indexing a storage system according to one embodiment.

FIG. 2 shows a process 300 for indexing a storage system, according to one embodiment.

Block 302 of the process includes generating, based on a scan of the storage system, one or more file records, each file record of the one or more file records corresponding to a file stored on the storage system at the time of the scan. For example, a single file record can be generated for each file in the current file directory of the storage system. Each file record can include one or more entries with one or more of the following fields: an entry number, a file name, a file path, a file size, a date of creation, a first timestamp, or a second timestamp (see FIG. 4). The first timestamp and second timestamp of each entry are discussed in further detail in other sections, in relation with a valid time window. Each entry can indicate a different version of the same file. In the initial scan, each file record might have only one entry. Furthermore, based on the initial scan, only the first timestamp of the entry can be populated, the second timestamp can be empty or null, indicating that the file is 'active' and that the version or first entry is currently valid.

In one embodiment, the scan is performed only an initial time (once), to establish a baseline of the one or more file records. Scans can have a large computational overhead, thus, performing this scan only once is beneficial.

Block 304 includes maintaining the one or more file records based on one or more notifications received from the storage system. It should be understood that the notifications can be generated continuously over time, whenever a file event occurs. Each of the one or more notifications can be generated by the storage system when a particular file is added, modified, moved or deleted on the storage system, thereby providing an alert to update the file records. The one or more notifications can including an identifier of the particular file (e.g., a file name and/or file path) to locate a file record to update. The file records can be maintained, by adding or updating a file record entry of the one or more file records (see, e.g., FIG. 4), or deleting one or more file records based on the notification. In one embodiment, the file records can be maintained also based on a snapshot list to determine if a file is orphaned and the corresponding file record should be deleted, as described in other sections.

Block 306 includes maintaining a snapshot list of the storage system, the snapshot list having snapshot data corresponding to one or more snapshots stored on the storage system. The snapshot data can include one or more timestamps, each timestamp defining a time that a corresponding snapshot, stored on the storage system, was generated (see, e.g., FIG. 5).

Block 308 includes generating a search result, based at least on a) the one or more file records, or b) the snapshot list, that satisfies one or more search parameters. This block can be initiated by a user request, the user request having one or more search parameters. The file records and snapshot data can be searched and filtered based on the search parameters to generate search results for a user.

Example Sequence

Figure 3:
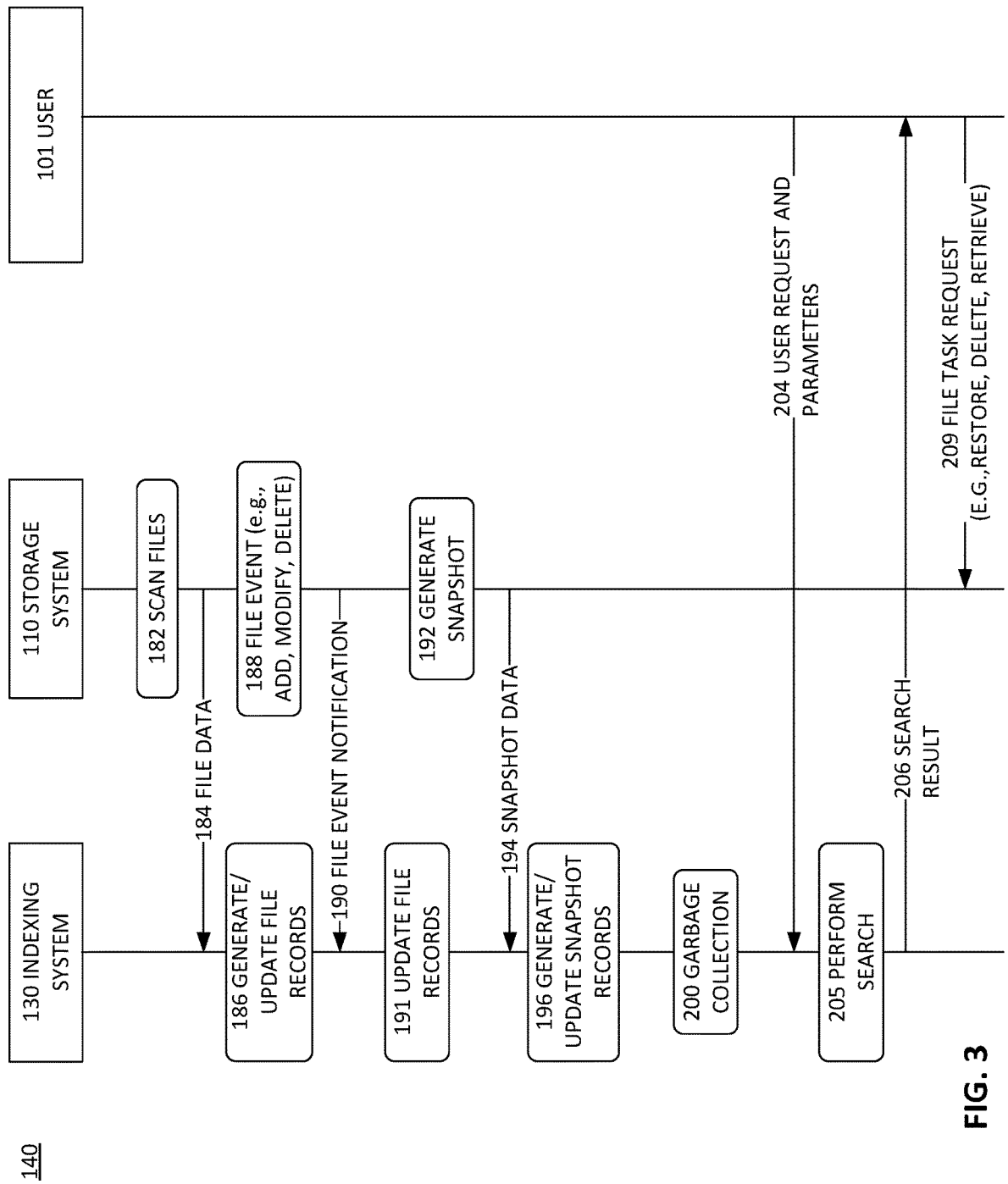
FIG. 3 shows an example sequence for indexing a storage system, according to one embodiment.

Referring now to FIG. 3, an example sequence 140 is shown for indexing a storage system, according to one embodiment. The indexing system can 182 scan files on the storage system or cause the storage system to scan the files and 182 send the file data to the indexing system. The indexing system can generate initial file records or update existing file records, based on the scan. In one embodiment, the scan is only performed once to beneficially reduce processing overhead and time cost, thereby providing a technical improvement to the way When a file event occurs, e.g., adding, moving, modifying, or deleting a file, a file event notification 190 is received by the indexing system. The notification can include a file name of a changed file, a timestamp of the notification or the time that the file was changed (the two should be nearly the same), and/or other file metadata. Based on the notification, the indexing system updates file records 191 to sync the file records with files stored in the storage system.

Storage system 110 can generate a snapshot 192 of the current file directory. The snapshot can have all the files present in file directory of the storage system at the time of the snapshot. Snapshots can be performed periodically, for example, as part of a data protection plan managed by the storage system. The snapshot data 194 is received indicating that a snapshot has occurred. This can include a snapshot timestamp indicating a time that the snapshot was generated by the storage system. Based on the snapshot data, the indexing system can generate and/or update snapshot records.

In one embodiment, the indexing system continuously and periodically sends requests for snapshot data to the storage system. In this manner, the snapshot data can be retrieved periodically and de-coupled from the generation of the snapshot. In one embodiment, the snapshot data is also event-driven, and the storage system sends a snapshot notification in the same manner that it sends the file event notification, anytime that a snapshot is generated or deleted. In either case, the accuracy of the snapshot records as a reflection of the snapshots in the storage system can thus be maintained.

In one embodiment, the indexing system can, based on the file records and/or the snapshot list, perform a 'clean up' of the file records. In one embodiment, the garbage collection request 200 is performed when a snapshot is removed/deleted. The indexing system can remove a file record corresponding to an orphaned file in the storage system by determining that a file is not in a current file directory of the storage system and also is not persisted in a snapshot of the storage system based on cross-referencing the one or more file records with the snapshot list.

For example, if the indexing system has determined that a snapshot has been deleted from the storage system, the indexing system can further determine if file records that were in the deleted snapshot still exist in other snapshots. This can be done by cross-referencing the valid time windows of file entries against the snapshot timestamps in the snapshot list. The indexing system can then 200 perform garbage collection, for example, by removing the 'orphaned' file records thereby freeing up memory in the indexing system (e.g., preventing 'memory leak') and maintaining the integrity of the file records.

In contrast, known indexing systems struggle with the problem of managing a file index after a snapshot is deleted. This can require scanning of all snapshots anytime a snapshot is generated to determine whether any of the file records that are related to a deleted snapshot can be completely removed by garbage collection. Additional details for determining whether a file record should be 'cleaned' are discussed in other sections, with reference to FIGS. 4 and 5.

Referring back to FIG. 3, a user machine 101 can send a user request and parameters 204 with search parameters. The search parameters can include keywords and/or particular metadata filters. For example, search parameters can include a filename (e.g., 'myfile.txt'), file path (e.g., '/main/mydocuments/'), a date range, a snapshot ID to filter out search results based on a particular snapshot, and more. The indexing system can 205 perform a search based on the file records and/or snapshot records. The indexing machine can then return the search results (e.g., a file name, a file path, a snapshot that a file exists in, versions of files and the snapshots those versions exist in, and more). Based on this information, the user can then perform additional file tasks 209 such as restoring, deleting, and retrieving files from the storage device.

File Record

Figure 4:
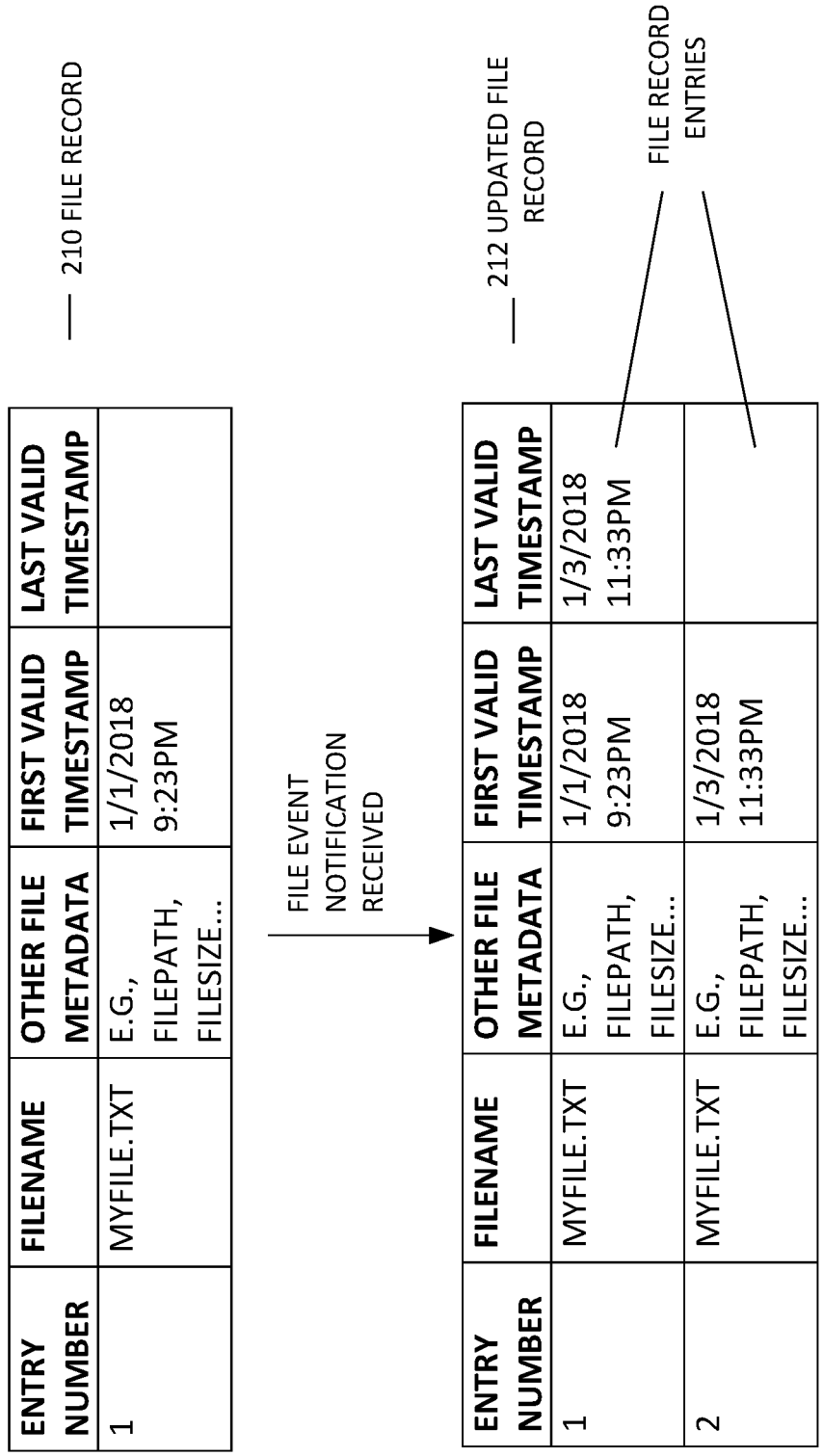
FIG. 4 shows a file record according to one embodiment.

FIG. 4 shows a file record according to one embodiment. The file record can have an entry number, a file name, other file metadata, a first valid timestamp, and a last valid timestamp. When a file event notification is received by the indexing server, the indexing server can update the file record 210 by adding a new entry, resulting in an updated file record 212. In such a case, the indexing server can add a 'last valid timestamp' to the previous record of the file, where the particular file has been modified, and the new entry can have a 'first valid timestamp' with the time of the modification. In this manner, each entry of an existing file record correlates to a version of the file. If, however, the notification indicates that the particular file has been deleted, a 'last valid' time may be added to show the time of deletion, but no new entry would be added, because the file no longer exists on the current file directory.

If a file is not mentioned in the event notification, then the corresponding file record would not be modified. This provides an efficient method of maintaining file records in a storage device because files are so numerous, it is advantageous to update the file records based only on what has changed, as opposed to constantly scanning the file storage.

Furthermore, by looking at the file record timestamps, an indexing server can determine what all the versions of the file are, when the file has been changed, and whether or not the file is in the current file directory of the storage system. For example, if the last valid timestamp shows that the file is no longer valid and no new entry is made, it can be determined that the file is deleted. The past versions of the file, however, might still be present in snapshots. A valid time window or period for a file version can be defined as the time between the first valid and last valid timestamps of a file entry. If no last valid timestamp is present, then it can be determined that the file version is still valid and that the file is currently 'live' (e.g., the file is in current file directory of the storage system, rather than deleted). Thus, each of the one or more file records defines one or more time periods in which one or more file versions of a corresponding file record is deemed valid wherein each time period is defined by a first timestamp and a second time stamp, the first timestamp defining the beginning of the time period and the second timestamp defining the end of the time period for the file version. Where the second timestamp is empty or null, this defines the valid time period as open or currently valid, and the file can be defined as active.

Garbage Collection

The indexing server can clean up file records in the indexing server when the corresponding files on the storage server are orphaned. In one embodiment, a garbage collection algorithm can be implemented when it is determined that a snapshot has been deleted/removed from the storage system. The indexing system can determine that a snapshot has been deleted based on comparing new snapshot data (retrieved from the storage system) with the snapshot list. If the new snapshot data has additional snapshots, then it can be determined that a snapshot has been added. If, however, the new snapshot data has fewer snapshots, the snapshots that are on the snapshot list but not in the new snapshot data can be deemed as deleted.

Figure 5:
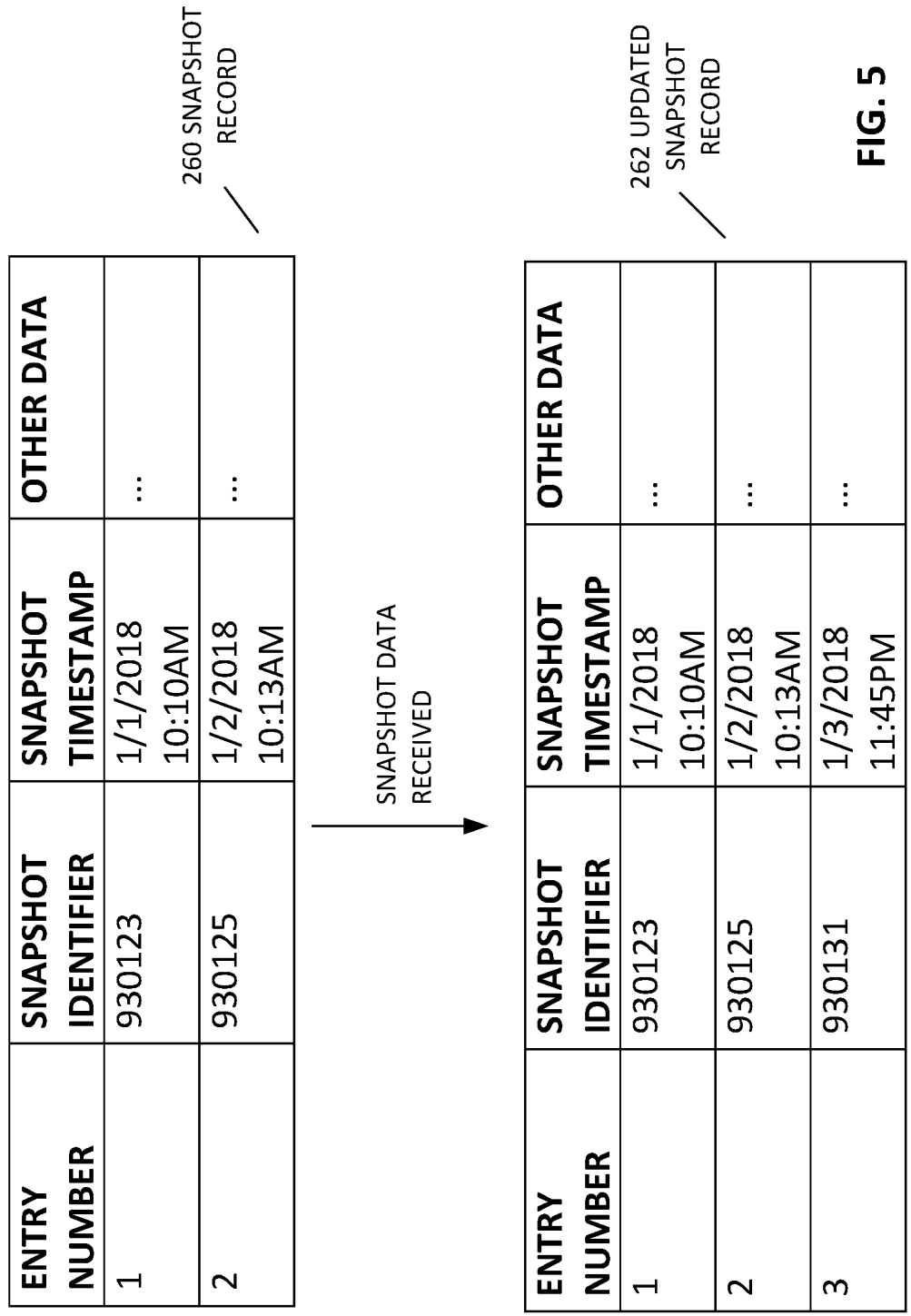
FIG. 5 shows an example of a snapshot list according to one embodiment.

As mentioned above, if a last valid time stamp is present in the latest file entry of a file record (i.e., no additional file entries for the record), then the file can be determined to be deleted (i.e., not in the current file directory of the storage system), but might still persist through a snapshot. The indexing server can then cross reference the time windows of each entry of the deleted file record with snapshot timestamps (as shown in FIG. 5). If any one of the snapshot timestamps is within a time window of any one of the file record entries (e.g., the snapshot timestamp is greater than or equal to the first valid timestamp and less than or equal to the last valid timestamp of an entry), then it can be determined that the file still lives or persists through the timestamp. If not, then it can be determined that the file no longer exists on the storage system (neither in the current file directory nor in snapshots). The indexing server can then perform garbage collection (e.g., delete all file records relating to orphaned files and free up memory). The indexing server can perform such a cleanup algorithm periodically, and/or when snapshot data is received, and/or when a file event notification is received.

Snapshot List

FIG. 5 shows an example of a snapshot list/record in one embodiment, that can be managed by an indexing server. The snapshot list can contain all the snapshots that are previously generated and/or currently stored on the storage system. An indexing server can periodically retrieve snapshot data from the storage system, e.g., by polling the storage system for data.

When snapshot data is received, the indexing server can update a snapshot record 260, for example, when a new snapshot has been generated, or when a snapshot is deleted, resulting in an updated snapshot record 262. The snapshot history can have an entry for each snapshot, a snapshot identifier, a snapshot timestamp that defines a generation time of the snapshot, and other snapshot data.

Search Results

In one embodiment, one or more snapshot timestamps can be cross-referenced against the first valid timestamp and/or the second valid timestamp of one or more file records. By doing so, the indexing server can make a variety of determinations and provide valuable insights through search results.

In a first example, the indexing system can quickly and simply determine which files are in the current file directory of the storage system (i.e., the 'active files'), by filtering the file records for files that do not have a 'last valid' timestamp in the newest entry. This indicates that no event notifications have been received showing that the file has been deleted. In one embodiment, a filter can be enabled to only return files that are currently active. The user can then review the list of files and perform actions like download files locally, delete files, assign retention, and more. In such a case, generating of the search result can include a) identifying, in the one or more file records, file records that have the first timestamp but not the second time stamp, to further identify active files within a current file directory of the storage system and b) generating the search result based on the identified file records.

In a second example, the indexing server can search for a file that has been deleted but still exists in one or more snapshots on the storage system, based on a) the one or more search parameters and b) by cross-referencing the time period of the one or more file records with a snapshot timestamp in the snapshot list. For example, if a user provides search parameters such as filename and/or file path, and a particular date range, the indexing server can find the matching file record based on filename and/or file path, and then, based on the first valid and second valid timestamp, determine which versions fall within the user provided date range. The indexing server can then identify one or more snapshots that may have the file, by determining which snapshot timestamp has a timestamp that falls within the time window of the file record entry (e.g., within the first valid and last valid timestamps).

In one embodiment, a filter can be enabled that allows a user to show only deleted files. The indexing server can then provide a list of snapshots for the user, with which the user can restore a deleted file to the storage system.

In a third example, the indexing server can generate a list of all versions of a particular file over all snapshots on the storage server based on a) a file name and file path of the one or more search parameters, and b) by cross-referencing the time period of the one or more file records with a snapshot timestamp in the snapshot list. For example, all entries of a file record (identified by a file name and/or file path) that have a time window that contain a snapshot timestamp (e.g., the snapshot timestamp is greater than or equal to a first valid time stamp, and less than or equal to a last valid timestamp) can indicate that one or more corresponding files and file versions are stored and retrievable on the storage server through the snapshots. The indexing server can provide the list/results of the file versions, and/or the snapshots, to a user, who can then restore a particular version to the current file directory of the storage system. This list can include the file version that is in the current file directory.

In a fourth example, the generating of the search result includes identifying files that persist through a particular snapshot on the storage system based on a) the one or more search parameters, and b) by cross-referencing the time period of the one or more file records with a snapshot timestamp of the particular snapshot. For example, the indexing server can restrict a search to a particular snapshot by filtering out any file record with entries that do not have a valid time window that overlap with the particular snapshot timestamp. The snapshot can be provided in the search parameters (e.g., as a selectable item in a user interface, chosen by a user). The indexing server can then return a list of files and/or file versions that persist through the particular snapshot, with which a user can use to restore or download locally, a particular file version.

In one embodiment, the indexing server can generate a list of snapshots based on the snapshot list and provide the list of snapshots as a selectable filter in a user interface to a user. The user can select a snapshot from the list. Based on the selected snapshot, the indexing server can then cross-reference the selected snapshot (with a corresponding entry in the snapshot list) against the one or more file records to generate a search result filtered through the selected snapshot.

In a fifth example, generating of the search result includes identifying all snapshots in the snapshot list that a particular file persists through, based on a) the one or more search parameters, and b) cross-referencing the time period of the one or more file records with a snapshot timestamp in the snapshot list. For example, the indexing server can determine all snapshots that a file exists in by finding which snapshot timestamps fall within any of the time windows of any entry of the file record. Snapshots that are not in any of the time windows should not contain any version of that particular file. Snapshots that are within that time window would persist the particular file. Thus, a list of those snapshots can be generated.

In one embodiment, the indexing server can provide an option to a user through an interface to allow the user to request more details of a particular file. The indexing server can provide a list of details in including the list of all snapshots have the particular file. In one embodiment, the user can specify a particular file version and the indexing server can provide a list of all snapshots for the particular file version, in the manner mentioned above.

Thus, based on the process and systems described herein, only one snapshot scan need be performed when indexing a storage system. Notifications are then utilized after the initial snapshot to maintain the integrity of the indexed file records. In addition, the storage device does not need to add a new instance of each file for every snapshot. Rather, the changes to files that occur between snapshots can be tracked and stored. Furthermore, it is fast and simple to fine all the files in a particular snapshot, leveraging the timestamps of the file records and snapshots, maintained by the indexing service. Finally, garbage collection techniques to remove expired snapshots and orphaned files can leverage the file records and the snapshot list to determine whether deleted files still exist in any snapshots. If none of the snapshot timestamps fall within any valid time windows of a file (e.g. valid time windows of each version), and the file has been deleted, then it can be determined that the file should be cleaned up from the storage system.

Figure 6:
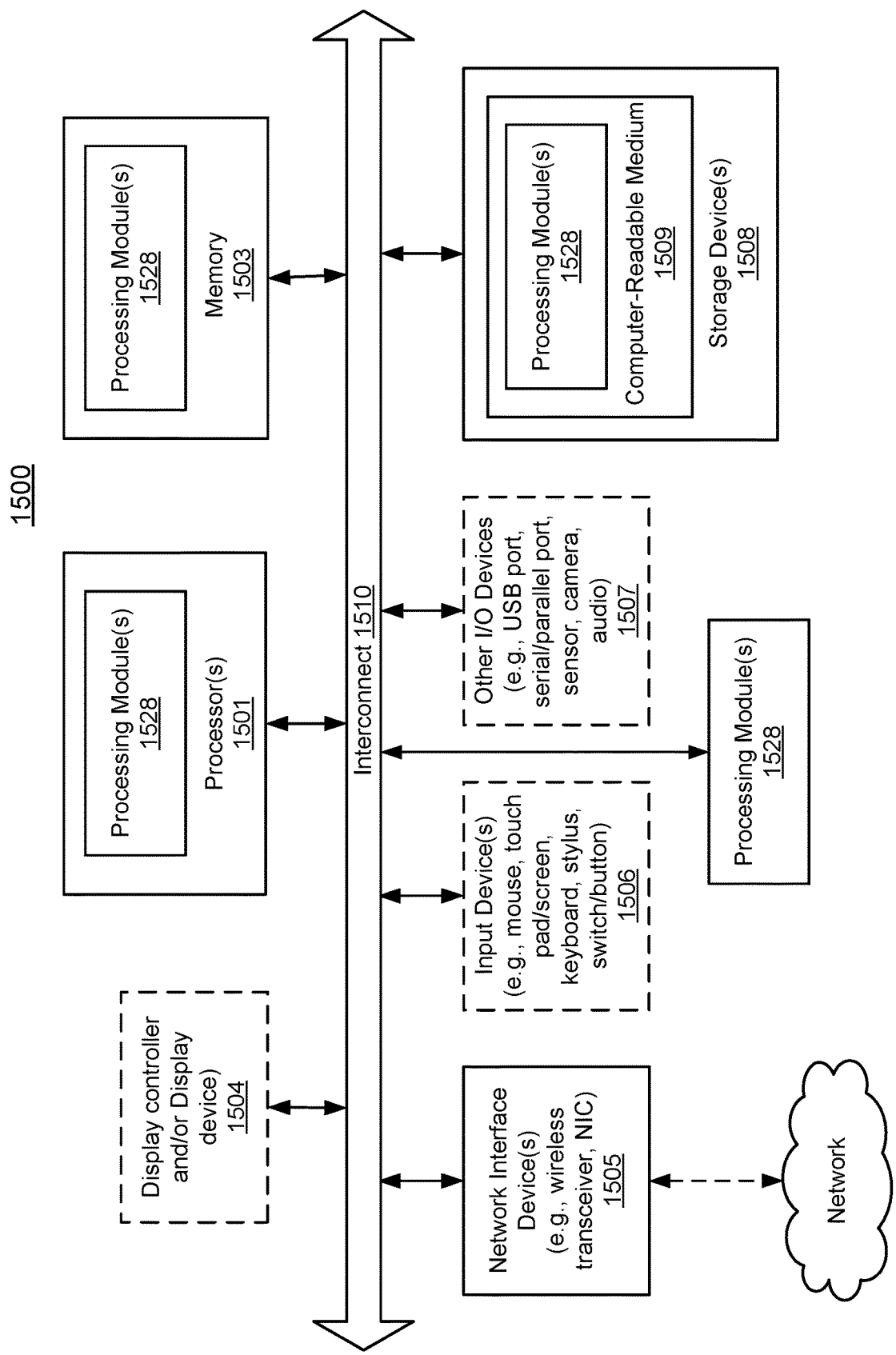
FIG. 6 shows a data processing system according to one embodiment.

FIG. 6 is a block diagram illustrating an example of a data processing system which may be used with one embodiment of the invention. For example, system 1500 may represent any of data processing systems such as storage system 110, indexing system 130, user machine 101, and other systems, for performing any of the processes or methods described in the present disclosure. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, operating system 118, event notification manager 125, snapshot manager 122, file manager 124, interface module 133, search module 131, and indexing logic module 132, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a computing device for indexing a storage system, comprising:
    generating, based on a scan of the storage system, one or more file records, each file record of the one or more file records corresponding to a file stored on the storage system;
    maintaining the one or more file records based on one or more notifications received from the storage system;
    maintaining a snapshot list of the storage system, the snapshot list having snapshot data corresponding to one or more snapshots stored on the storage system; and
    generating a search result that satisfies one or more search parameters, based at least on a) the one or more file records, or b) the snapshot list, including identifying files that are deleted on the storage system but persist through the one or more snapshots on the storage system, based on a) the one or more search parameters and b) by cross-referencing a time period of the one or more file records with a snapshot timestamp in the snapshot list, wherein each of the one or more file records defines the time period in which a file version of a corresponding file record is deemed valid.

2. The method according to claim 1, wherein
    each of the one or more notifications is generated by the storage system when a particular file is added, modified, moved, or deleted on the storage system, the one or more notifications including an identifier of the particular file; and
    maintaining the one or more file records includes adding or updating a file record entry of the one or more file records, or deleting one or more file records based on the notification.

3. The method according to claim 1, wherein the snapshot data includes one or more timestamps, each timestamp defining a time that a corresponding snapshot, stored on the storage system, was generated.

4. The method according to claim 1, wherein the scan of the storage system is performed only an initial time to establish a baseline of the one or more file records.

5. The method according to claim 1, wherein maintaining the snapshot list includes
    periodically requesting the storage system to send the snapshot data, the snapshot data including a) a list of one or more snapshots that are stored on the storage system, and b) a timestamp corresponding to each of the one or more snapshots, each timestamp relating to a time in which the snapshot was generated; and
    updating the snapshot list to add or remove a snapshot in the snapshot list based on the snapshot data.

6. The method according to claim 1 further comprising removing a file record from the one or more file records by determining that a file is not in a current file directory of the storage system and is not persisted in a snapshot of the storage system based on cross-referencing the one or more file records with the snapshot list.

7. The method according to claim 1, including generating a list of snapshots based on the snapshot list and providing the list of snapshots as a selectable filter in a user interface, wherein a selected snapshot has a corresponding snapshot timestamp which is cross-referenced against the one or more file records to generate the search result.

8. The method according to claim 1, wherein the storage system is a network attached storage system (NAS) having, as computer memory for file storage, a hard drive disk, flash memory, or combinations thereof.

9. The method according to claim 1, wherein each of the file records includes one or more entries, each entry having one or more of the following fields: a version number, a file name, a file path, a file size, a date of creation, a first timestamp, or a second timestamp.

10. The method according to claim 1, wherein the computing device registers with a notification registry of the storage system and the one or more notifications are sent by the storage system based on the notification registry.

11. The method according to claim 10, wherein the one or more notifications are sent in real-time.

12. The method according to claim 1, wherein the time period is defined by a first timestamp and a second time stamp, the first timestamp defining the beginning of the time period and the second timestamp defining the end of the time period for the file version.

13. The method according to claim 7, wherein the generating of the search result includes
    identifying, in the one or more file records, file records that have the first timestamp but not the second time stamp, to further identify active files within a current file directory of the storage system, and
    generating the search result based on the identified file records.

14. The method according to claim 13, wherein the generating of the search result includes
    identifying all versions of a particular file on the storage system including versions that persist through the one or more snapshots based on a) a file name and file path of the one or more search parameters, and b) by cross-referencing the time period of the one or more file records with a snapshot timestamp in the snapshot list.

15. The method according to claim 13, wherein the generating of the search result includes identifying files that persist through a particular snapshot on the storage system based on a) the one or more search parameters, and b) by cross-referencing the time period of the one or more file records with a snapshot timestamp of the particular snapshot.

16. The method according to claim 13, wherein the generating of the search result includes
identifying all snapshots in the snapshot list that a particular file persists through, based on a) the one or more search parameters, and b) cross-referencing the time period of the one or more file records with a snapshot timestamp in the snapshot list.

17. A non-transitory machine-readable medium having instructions stored therein, which when executed by a processor, cause the processor to perform operations, the operations comprising:
generating, based on a scan of the storage system, one or more file records, each file record of the one or more file records corresponding to a file stored on the storage system at the time of the scan;
maintaining the one or more file records based on one or more notifications received from the storage system;
maintaining a snapshot list of the storage system, the snapshot list having snapshot data corresponding to one or more snapshots stored on the storage system; and
generating a search result that satisfies one or more search parameters, based at least on a) the one or more file records, or b) the snapshot list, including identifying files that are deleted on the storage system but persist through the one or more snapshots on the storage system, based on a) the one or more search parameters and b) by cross-referencing a time period of the one or more file records with a snapshot time stamp in the snapshot list, wherein each of the one or more file records defines the time period in which a file version of a corresponding file record is deemed valid.

18. A system comprising:
a processing system having at least one hardware processor, the processing system coupled to a memory programmed with executable instructions that, when executed by the processing system, perform operations comprising:
generating, based on a scan of the storage system, one or more file records, each file record of the one or more file records corresponding to a file stored on the storage system at the time of the scan;
maintaining the one or more file records based on one or more notifications received from the storage system;
maintaining a snapshot list of the storage system, the snapshot list having snapshot data corresponding to one or more snapshots stored on the storage system; and
generating a search result that satisfies one or more search parameters, based at least on a) the one or more file records, or b) the snapshot list, including identifying files that are deleted on the storage system but persist through the one or more snapshots on the storage system, based on a) the one or more search parameters and b) by cross-referencing a time period of the one or more file records with a snapshot timestamp in the snapshot list, wherein each of the one or more file records defines the time period in which a file version of a corresponding file record is deemed valid.

19. The system according to claim 18, wherein
each of the one or more notifications is generated by the storage system when a particular file is added, modified, moved, or deleted on the storage system, the one or more notifications including an identifier of the particular file; and
maintaining the one or more file records includes adding or updating a file record entry of the one or more file records, or deleting one or more file records based on the notification.

20. The system according to claim 18, wherein the snapshot data includes one or more timestamps, each timestamp defining a time that a corresponding snapshot, stored on the storage system, was generated.

* * * * *

UNITED STATES PATENT AND TRADEMARK OFFICE
CERTIFICATE OF CORRECTION

| | |
|---|---|
| PATENT NO. | : 11,238,011 B2 |
| APPLICATION NO. | : 16/250993 |
| DATED | : February 1, 2022 |
| INVENTOR(S) | : James Morton et al. |

It is certified that error appears in the above-identified patent and that said Letters Patent is hereby corrected as shown below:

In the Claims

In Claim 13, Column 14, Line 50, delete "according to claim 7," and insert --according to claim 12,--.

Signed and Sealed this
Ninth Day of July, 2024

Katherine Kelly Vidal
*Director of the United States Patent and Trademark Office*